US008607679B2

(12) United States Patent
Heflin et al.

(10) Patent No.: US 8,607,679 B2
(45) Date of Patent: Dec. 17, 2013

(54) LAMINATE FLOORING SAW

(75) Inventors: Christopher Heflin, Oak Park, IL (US); Gregg M. Mangialardi, Park Ridge, IL (US); Cui Ke, Arlington Heights, IL (US); Matthew M. Rybka, Hoffman Estates, IL (US); P. Sean Gallagher, Arlington Heights, IL (US); Bryan M. Shova, Columbus, OH (US); Donald J. Staufenberg, Dublin, OH (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/481,285

(22) Filed: May 25, 2012

(65) Prior Publication Data

US 2012/0234151 A1 Sep. 20, 2012

Related U.S. Application Data

(62) Division of application No. 12/199,604, filed on Aug. 27, 2008, now Pat. No. 8,186,257.

(51) Int. Cl.
*B23D 33/02* (2006.01)
*B26D 5/08* (2006.01)

(52) U.S. Cl.
USPC .................................. 83/473; 83/581; 83/701

(58) Field of Classification Search
USPC ................. 83/581, 399, 471, 473, 477.2, 701
See application file for complete search history.

(56) References Cited

U.S. PATENT DOCUMENTS 2,602,474 A * 7/1952 Truchan ....................... 83/471.3
2,629,410 A * 2/1953 Cadwell .......................... 83/485
2,696,854 A 12/1954 Woodruff
2,818,892 A * 1/1958 Price .............................. 83/454
3,138,180 A 6/1964 Schultz
3,842,700 A * 10/1974 Novak ............................ 83/743
4,011,782 A * 3/1977 Clark et al. .................. 83/471.3
4,206,910 A 6/1980 Biesemeyer
4,320,678 A 3/1982 Volk
4,510,834 A * 4/1985 Greene et al. ................... 83/453
4,527,453 A 7/1985 van Hauten
4,630,656 A * 12/1986 Collins ...................... 144/154.5
4,637,288 A * 1/1987 Olsen et al. ..................... 83/375
4,658,687 A 4/1987 Haas et al.
4,756,220 A * 7/1988 Olsen et al. ..................... 83/375
4,920,845 A * 5/1990 Blanchette ...................... 83/574
4,987,813 A * 1/1991 Viazanko .................... 83/471.3
5,090,283 A 2/1992 Noble
5,105,862 A * 4/1992 Skinner et al. ................ 144/287
5,121,554 A * 6/1992 Havins ............................ 33/640
5,755,148 A * 5/1998 Stumpf et al. ............... 83/468.2
5,778,747 A * 7/1998 Chen ........................... 83/471.3
5,964,041 A 10/1999 Daniel
6,021,700 A 2/2000 Garuglieri
6,067,885 A 5/2000 Brunson et al.

(Continued)

*Primary Examiner* — Sean Michalski
(74) *Attorney, Agent, or Firm* — Maginot, Moore & Beck

(57) ABSTRACT

A laminate flooring saw system which can be used for both rip cuts and miter cuts in one embodiment includes a first power switch proximate the saw and movable with the saw along a support arm;

a second power switch that is not movable with the saw along the support arm;

and a third switch movable between a first position wherein application of energy to the saw is dependent upon the position of the second power switch and independent of the position of the first power switch and a second position wherein application of energy to the saw is dependent upon the position of both the first power switch and the second power switch.

6 Claims, 14 Drawing Sheets

(56) References Cited

U.S. PATENT DOCUMENTS

| | | | | |
|---|---|---|---|---|
| 6,073,532 | A | 6/2000 | English | |
| 6,119,676 | A | 9/2000 | Greenland | |
| 6,418,830 | B1 * | 7/2002 | Stumpf et al. | 83/468.2 |
| 6,470,576 | B2 | 10/2002 | Watson | |
| 6,561,068 | B2 * | 5/2003 | Meredith et al. | 83/471.3 |
| 6,679,305 | B2 * | 1/2004 | Petersen | 144/253.1 |
| 6,742,266 | B2 | 6/2004 | Splane, Jr. | |
| 6,782,783 | B2 | 8/2004 | Shull et al. | |
| 6,845,768 | B2 * | 1/2005 | O'Banion et al. | 125/23.02 |
| 6,854,372 | B2 * | 2/2005 | Anthony | 83/441 |
| 6,886,440 | B2 | 5/2005 | Parks et al. | |
| 6,899,004 | B1 | 5/2005 | Miller | |
| 6,932,073 | B2 * | 8/2005 | Zhang | 125/13.01 |
| 6,971,297 | B1 | 12/2005 | Meredith et al. | |
| 6,990,882 | B2 | 1/2006 | Schonfelder | |
| 7,530,297 | B2 * | 5/2009 | Carroll et al. | 83/471.3 |
| D602,053 | S | 10/2009 | Heflin et al. | |
| D638,864 | S | 5/2011 | Comas | |
| 7,946,906 | B2 * | 5/2011 | Gifford et al. | 451/8 |
| 8,122,803 | B2 | 2/2012 | Abe | |
| 8,402,871 | B2 * | 3/2013 | Fuchs | 83/454 |
| 2003/0221531 | A1 * | 12/2003 | Anthony | 83/581 |
| 2004/0040430 | A1 * | 3/2004 | Shull et al. | 83/581 |
| 2004/0103768 | A1 * | 6/2004 | Meredith | 83/13 |
| 2004/0182215 | A1 * | 9/2004 | Ushiwata et al. | 83/522.15 |
| 2005/0204885 | A1 * | 9/2005 | Gass et al. | 83/581 |
| 2005/0211038 | A1 * | 9/2005 | Imamura et al. | 83/473 |
| 2006/0016305 | A1 * | 1/2006 | Urmson | 83/13 |
| 2006/0112804 | A1 * | 6/2006 | Dils et al. | 83/581 |
| 2006/0213341 | A1 * | 9/2006 | Hogan | 83/13 |
| 2008/0053284 | A1 | 3/2008 | Miller et al. | |
| 2008/0236355 | A1 | 10/2008 | Gass et al. | |
| 2011/0308368 | A1 | 12/2011 | Brown et al. | |
| 2012/0011977 | A1 | 1/2012 | Singer et al. | |
| 2013/0160630 | A1 * | 6/2013 | Groth | 83/743 |

* cited by examiner

LAMINATE FLOORING SAW

This application is a divisional application of application Ser. No. 12/199,604, filed on Aug. 27, 2008, and which will issue on May 29, 2012 as U.S. Pat. No. 8,186,257, the disclosure of such application which is totally incorporated by reference herein in its entirety.

FIELD OF THE INVENTION

This invention relates to the field of devices used to support and shape work-pieces and particularly to a device for supporting and cutting work-pieces.

BACKGROUND

Laminate flooring is a popular flooring product due to its ease of installment as well as its performance. Additionally, the various designs which are available for laminate flooring enhance its popularity with consumers. The designs include wood-grain patterns, slate, marble, mosaic, and granite. Additionally, a number of specialized products have been designed to ease installation of laminate flooring. Such products include transition strips, end caps, stair nosings, moldings and baseboards.

When laminates were first introduced, there was only one method of installation. The laminates were produced in a "tongue and groove" design. When installing the laminate, the tongue and grooves were glued together, then clamped and left to dry. Manufacturers have since developed flooring that requires no glue at all.

Accordingly, installation of laminate flooring has been significantly simplified. One difficult aspect of installation that remains, however, is cutting the laminate flooring to fit within a particular area. Most laminates are provided in planks that are 7-8 inches wide and about 4 foot long. Depending upon the width of a room, the final course of planks may need to be ripped to the appropriate width. Moreover, the lengths of the planks at opposing walls need to be trimmed. Additionally, miter cuts may be required to contour the planks to fit the contours of a particular room.

Traditionally, a number of different types of saws have been used to make the necessary miter and rip cuts in laminate floors. Such saws include table saws, hand saws, jig saws and circular saws. Each of these types of saws provides some advantages. A table saw gives very precise cuts and can be used to rip cut a work-piece. Additionally, table saws can be configured to provide angled cuts by angling the work-piece. Table saws, even the "portable" table saws, however, are large and heavy. Thus, an installer must either accept the difficulty in transporting the table saw near the area where the laminate is to be installed or carry each piece of laminate back and forth from the work area to the saw location. Additionally, many homeowners attempt to install a laminate floor on their own. In the event the homeowner does not own a table saw, a different approach is needed.

Hand saws are, in stark contrast to table saws, extremely mobile. Hand saws are also, however, labor intensive. Thus, while handsaws may reasonably be used to make cuts of a few feet, the large number of planks that may need to be cut for a particular installation presents a daunting challenge to those using handsaws. Moreover, handsaws are generally not as accurate as table saws.

Jig saws and circular saws are generally much more "portable" than table saws and greatly facilitate making a large number of cuts. Depending upon the particular jigs available to an installer, however, these saws still do not provide the accuracy achievable with a table saw. Thus, while professional installers may become very skilled with using a jig saw or circular saw, other users may generate an undesired amount of scrap as a result of erroneous cuts.

What is needed is a system which can be used to rip cut a work piece and to miter cut the work piece. What is further needed is a system which is portable so that it can be located at a work site. A further need is for a system that can provide the required portability while providing accurate cuts.

SUMMARY

In accordance with one embodiment of the present invention, there is provided a laminate flooring saw system which can be used for both rip cuts and miter cuts. In one embodiment the flooring saw system includes a fence, a base including a first locking member configured to cooperate with the fence to lock the fence along a first fence axis, a second locking member configured to cooperate with the fence to lock the fence along a second fence axis, the second fence axis perpendicular to the first fence axis and a support arm positioned above the base for supporting a power tool.

In accordance with another embodiment of the present invention, there is provided a portable saw system including a base, a movable support arm, a saw movable along the support arm, a first power switch proximate the saw and movable with the saw along the support arm, a second power switch that is not movable with the saw along the support arm and a third switch movable between a first position wherein application of energy to the saw is dependent upon the position of the first power switch and independent of the position of the second power switch and a second position wherein application of energy to the saw is dependent upon the position of both the first power switch and the second power switch.

In accordance with a further embodiment, a portable saw system includes a base with an articulation surface, an articulating platform configured to articulate on the articulation surface and to define a cutting axis and a pivot defining a pivot axis and pivotably connecting the articulating platform with the base, the pivot positioned such that the cutting axis intersects the pivot axis.

DESCRIPTION

Figure 1:
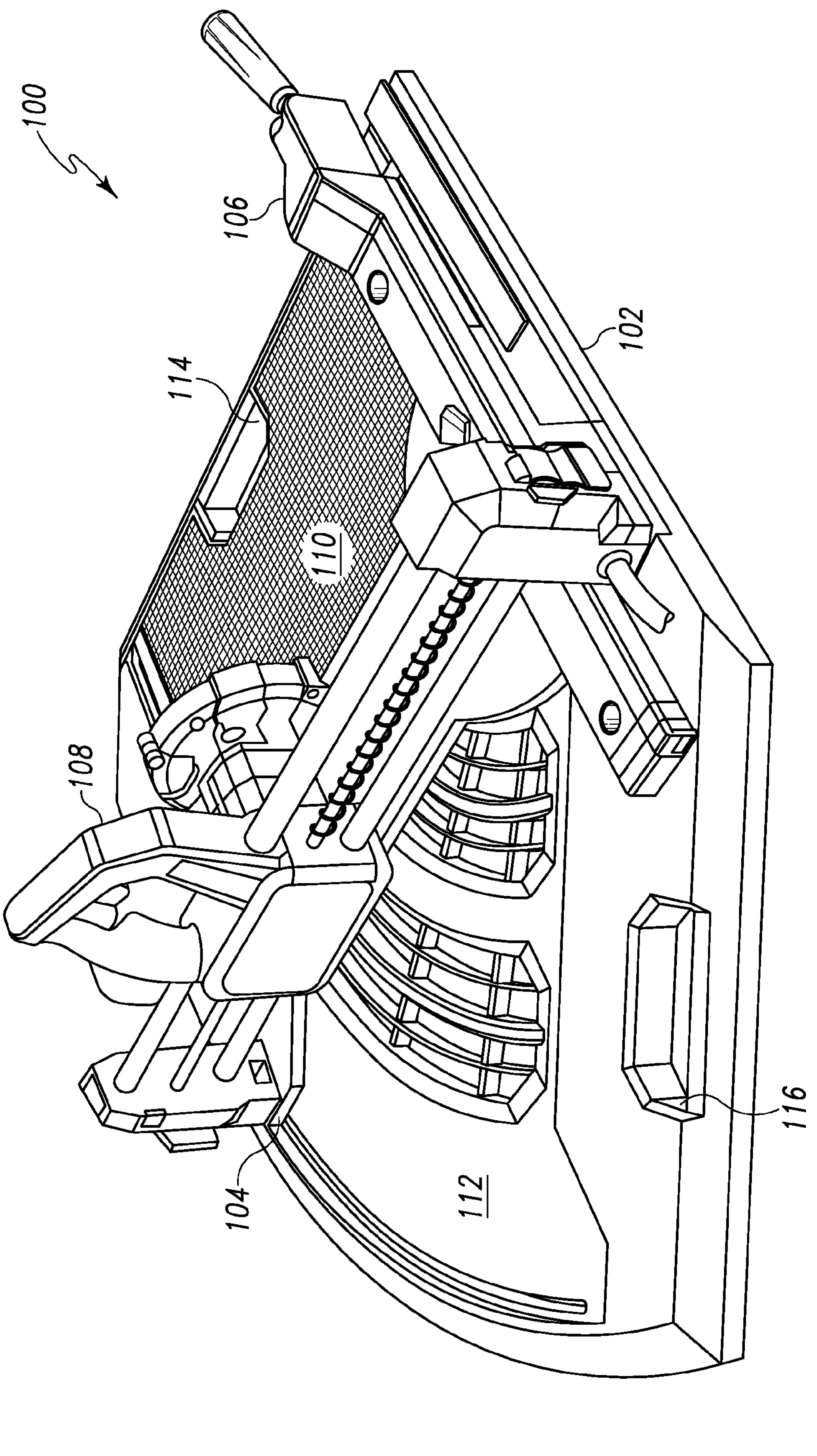
FIG. 1 depicts a perspective view of a laminate flooring saw system in accordance with principles of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
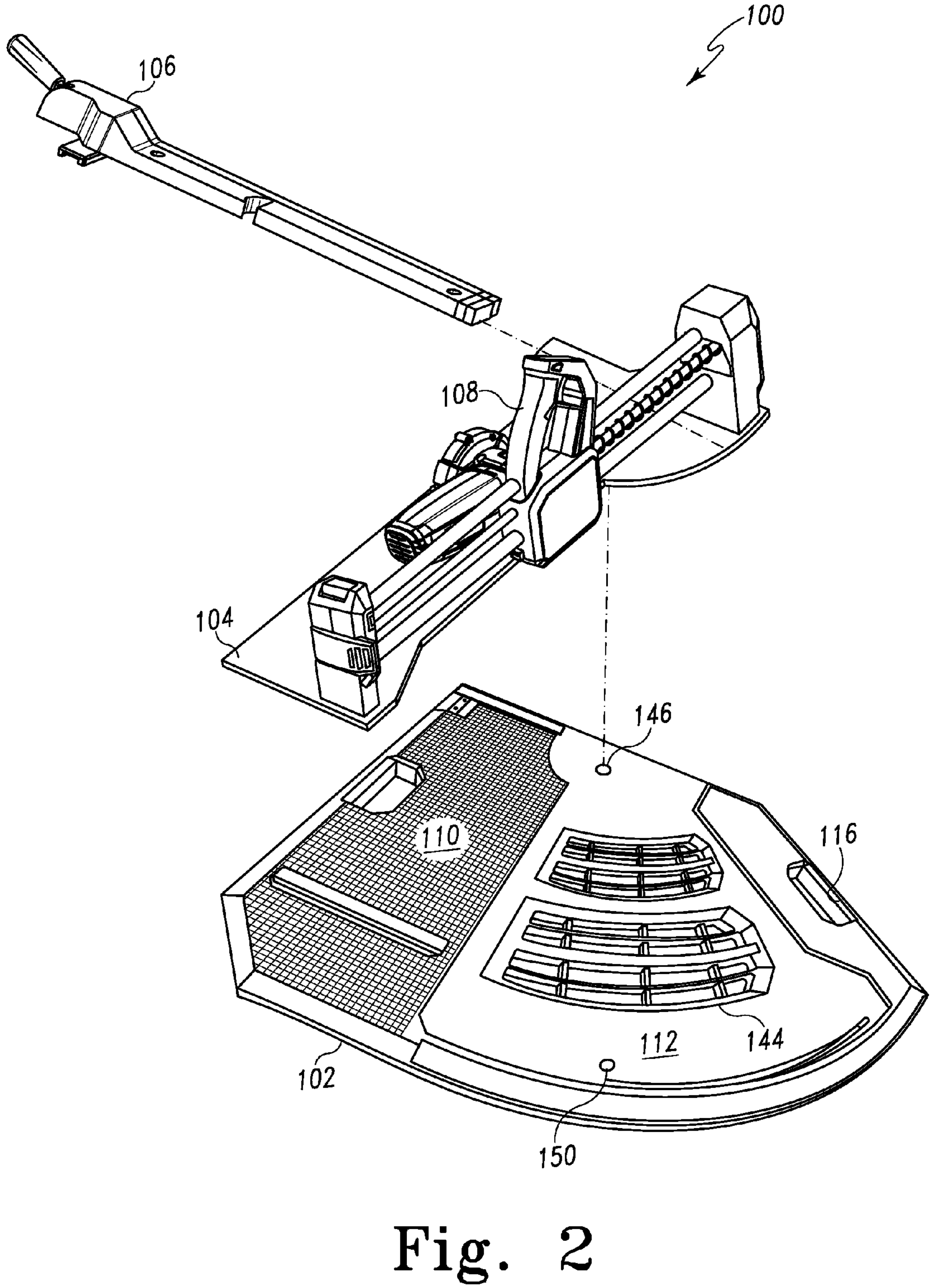
FIG. 2 depicts an exploded perspective view of the laminate flooring saw system of FIG. 1.
Figure 3:
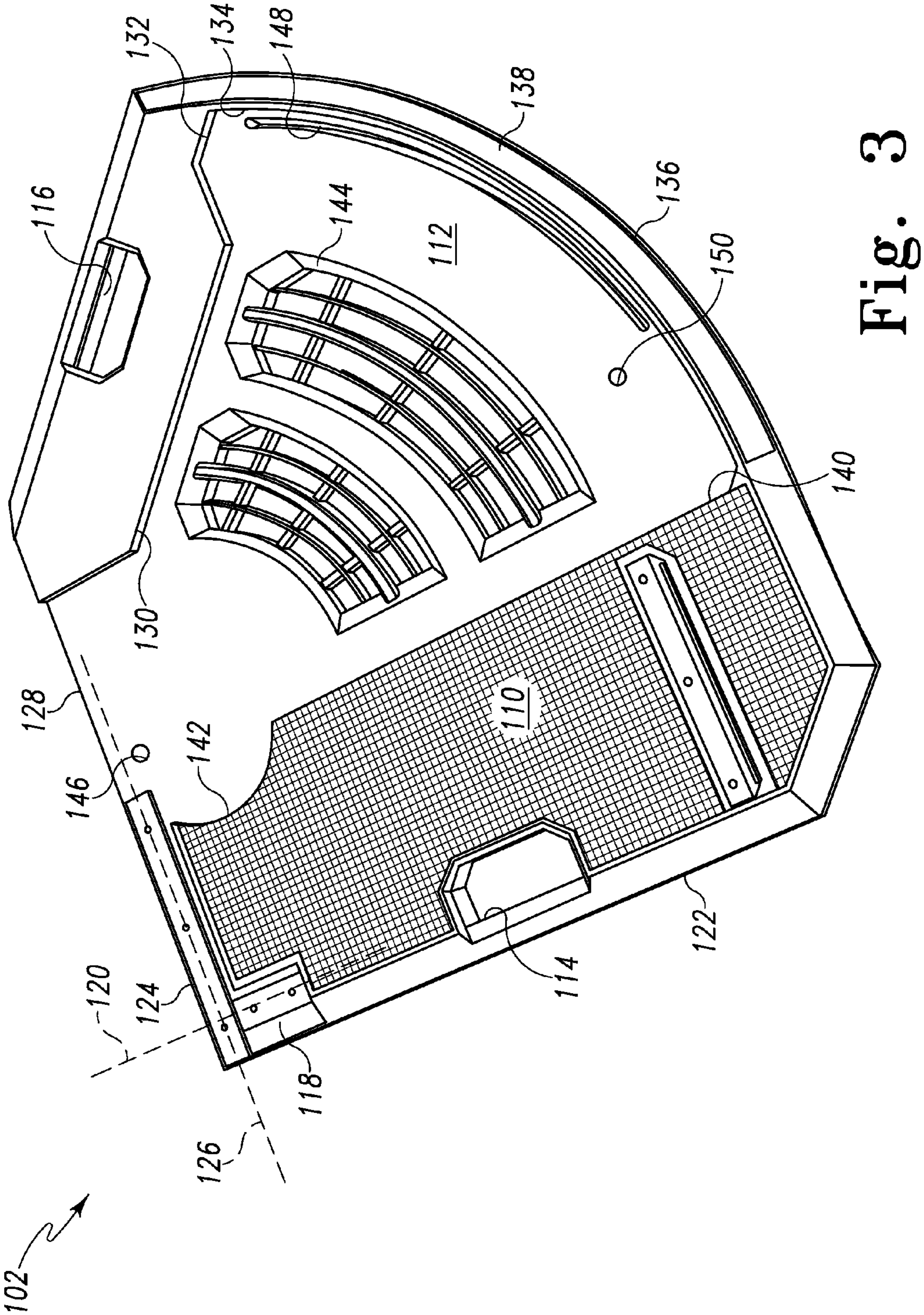
FIG. 3 depicts the base of the laminate flooring saw system of FIG. 1 with the fence and articulating support structure removed.

FIGS. 1 and 2 show a portable laminate flooring saw system 100. The system 100 includes a base 102, an articulating support structure 104 and a fence 106. A power tool 108 is supported by the support structure 104. The base 102 includes an upper table portion 110 and a sunken articulation surface 112. Two openings 114 and 116 extend through the base 102 to provide handholds. With reference to FIG. 3, a locking member 118 has an axis 120 that is substantially parallel to a rip edge 122. A locking member 124 has an axis 126 that is substantially parallel to a miter edge 128.

The sunken articulation surface 112 opens to the miter edge 128. A wall 130 on one side of the articulation surface 112 extends inwardly from the miter edge 128 and defines a recessed area 132. The articulation surface 112 terminates at a wall portion 134 at a curved edge portion 136 which includes a graduated angle indicator 138. A wall 140 extends from the sunken articulation surface 112 to the upper table portion 110. The wall 140 includes an arced portion 142. A number of evacuation ports 144, a pivot opening 146 and a guide slot 148 extend through the base 102 from the sunken articulation surface 112. A lock bore 150, which in this embodiment also extends through the base 102, is located proximate to the curved edge portion 136.

Figure 4:
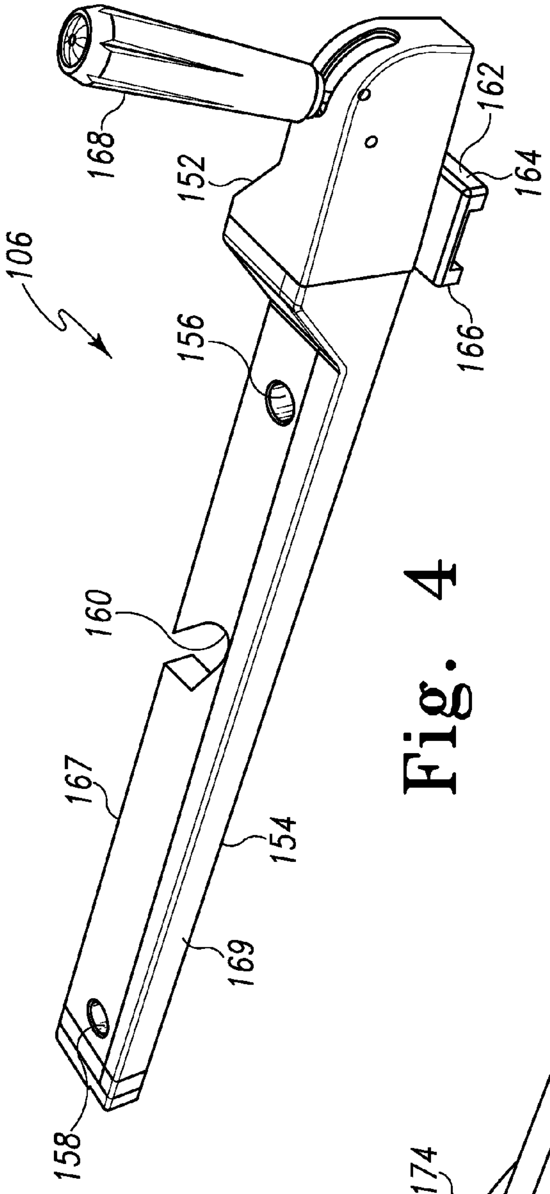
FIG. 4 depicts a perspective view of the fence of the laminate flooring saw system of FIG. 1.

The fence 106 is shown in FIG. 4. The fence 106 includes a main body 152 and a shaft 154. The shaft 154 includes two dog holes 156 and 158. The dog holes 156 and 158 may be used to attach accessories to the portable saw system 100 such as hold-down devices. One side 167 of the shaft 154 opens to a blade cutout 160 while the other side 169 does not incorporate a cutout. A locking mechanism 162 includes a movable dog 164 and a fixed dog 166. A handle 168 extends outwardly from the body 152 and is operably connected to the movable dog 164.

Figure 5:
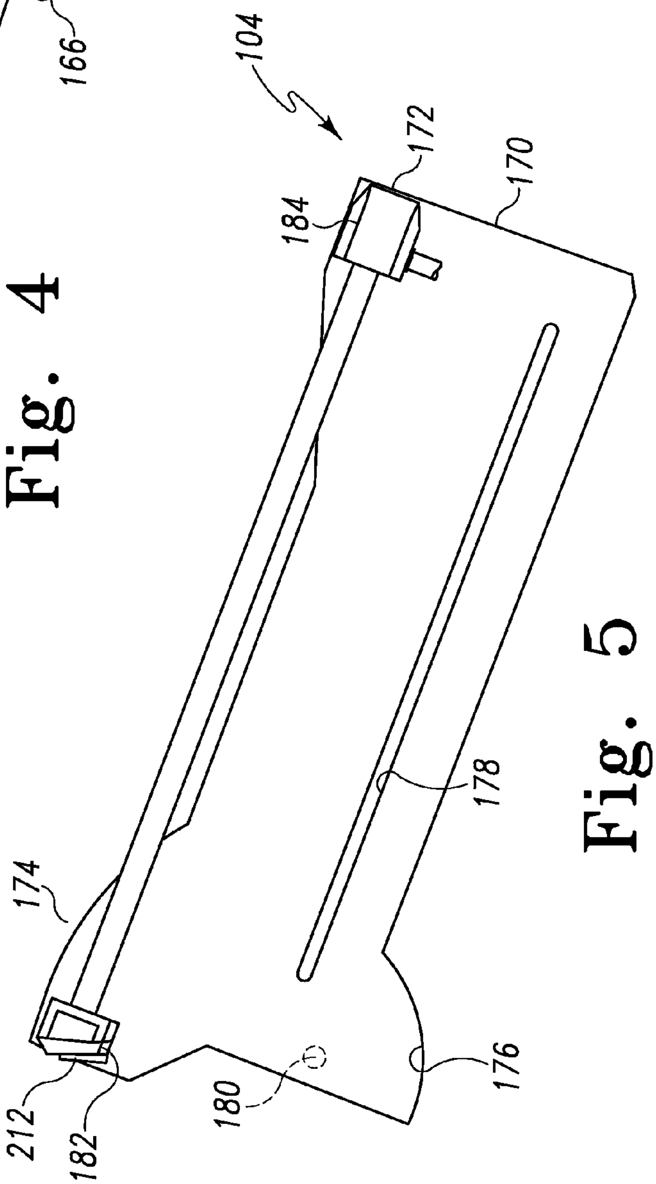
FIG. 5 depicts a top plan view of the articulating support structure of the laminate flooring saw system of FIG. 1.
Figure 6:
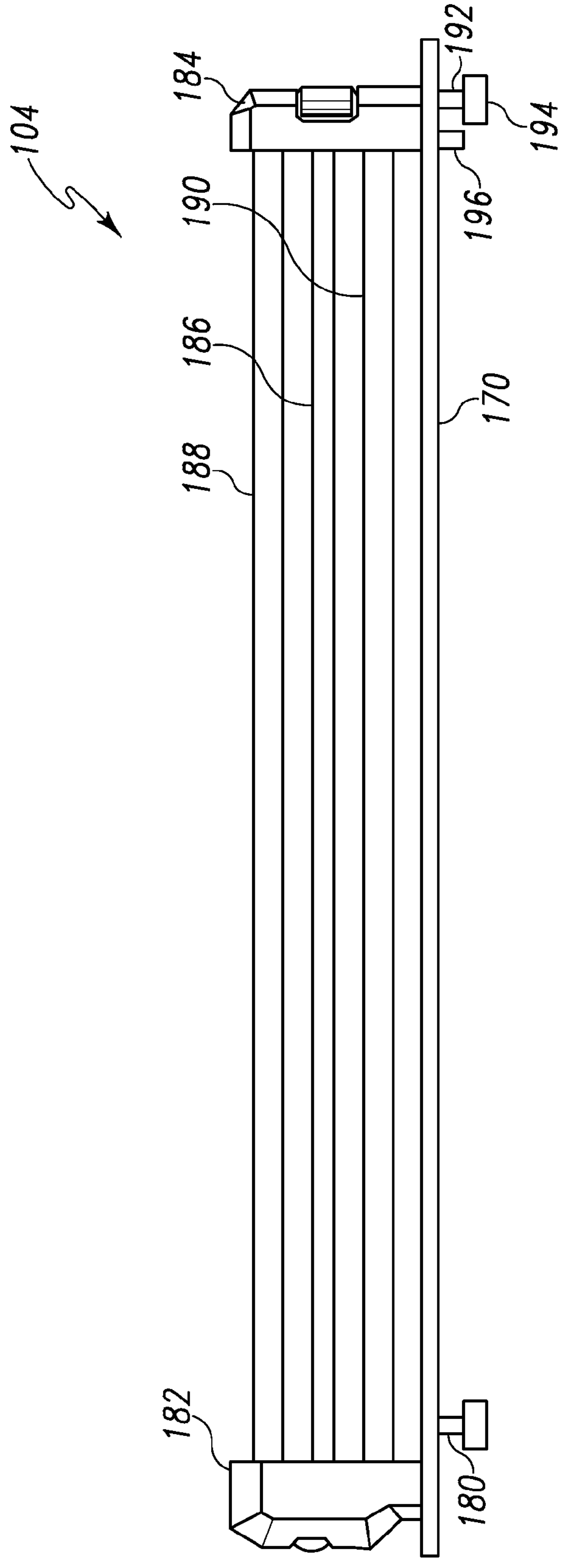
FIG. 6 depicts a side plan view of the articulating support structure of the laminate flooring saw system of FIG. 1 with a plunger in an extended position.

The articulating support structure 104 is shown in FIGS. 5 and 6 with the power tool 108 removed. The articulating support structure 104 includes an articulating base 170 with an extension 172, a support arm base portion 174 and a pivot base portion 176. A blade slot 178 extends through the articulating base 170 and is aligned with a pivot 180. A base pillar 182 is located on the support arm base portion 174 and a locking pillar 184 is located on the extension 172. A cord support arm 186 and two circular support arms 188 and 190 extend between the base pillar 182 and the locking pillar 184. A locking boss 192 with an enlarged head 194 is located beneath the locking pillar 184 and a movable plunger 196 is shown extending from the locking pillar 184 and through the articulating base 170.

Figure 7:
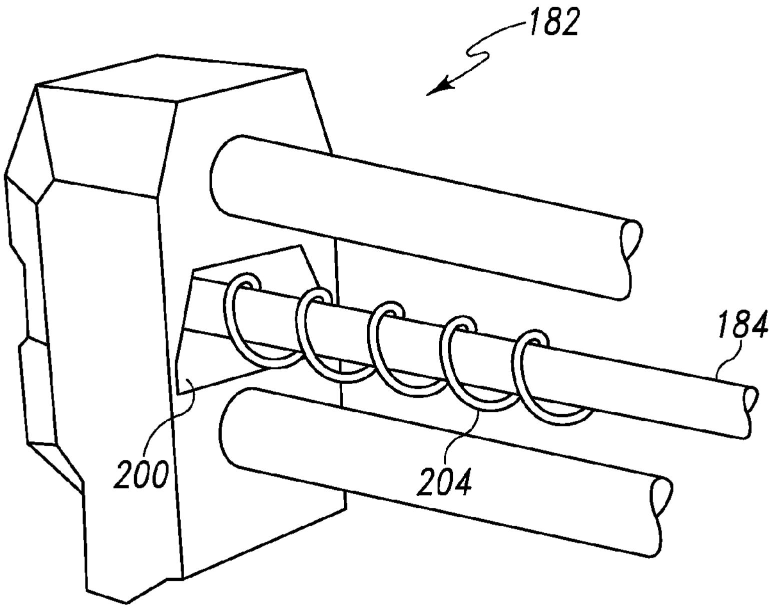
FIG. 7 depicts a side perspective view of the base pillar of the articulating support structure of the laminate flooring saw system of FIG. 1 showing a coiled power cord receptacle.
Figure 8:
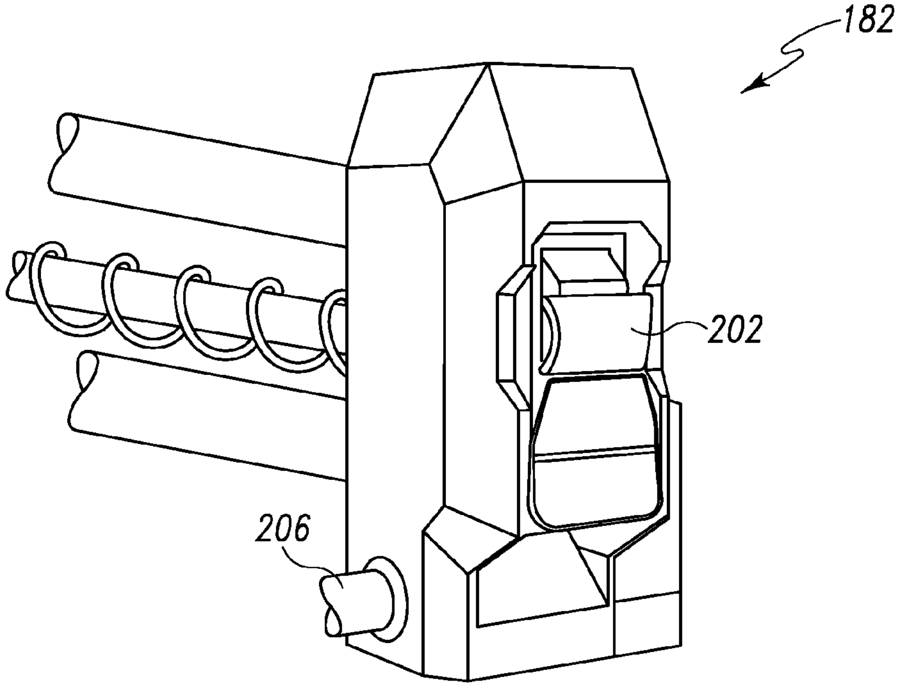
FIG. 8 depicts a side perspective view of the base pillar of the articulating support structure of the laminate flooring saw system of FIG. 1 showing a toggle switch in accordance with principles of the invention.

Referring to FIGS. 7 and 8, the base pillar 182 includes a power cord receptacle 200 and a toggle switch 202. The power cord receptacle 200 is sized to store a coiled power cord 204 which is coiled about the cord support arm 186. The cord support arm 186 extends outwardly from the receptacle 200. An external power cord 206 is received into the base pillar 182.

Figure 9:
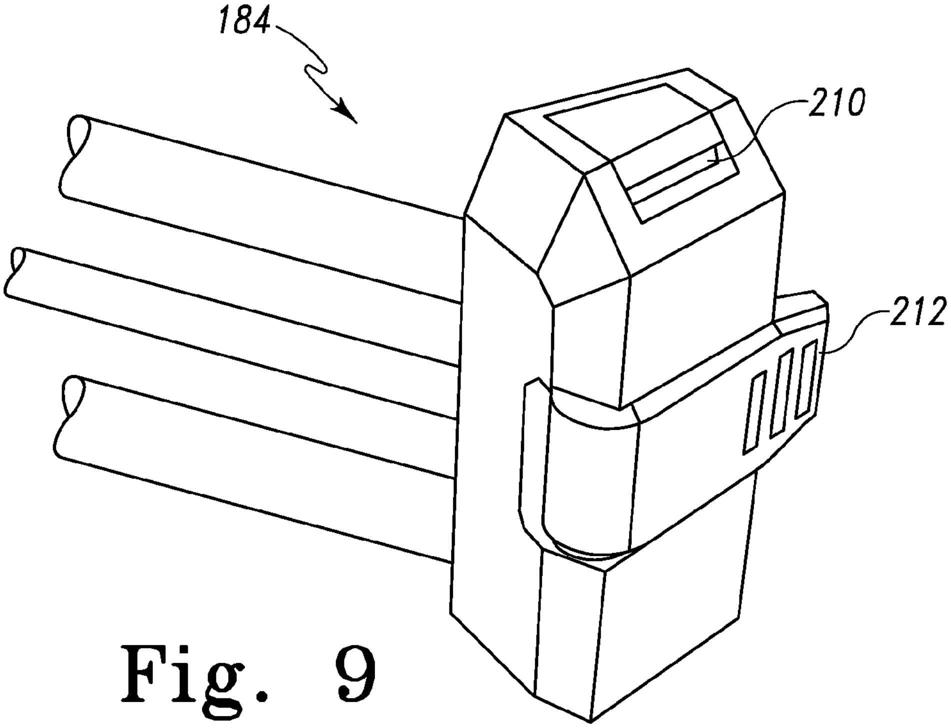
FIG. 9 depicts a side perspective view of the locking pillar of the articulating support structure of the laminate flooring saw system of FIG. 1 showing a rip lock button and a miter lock arm.
Figure 10:
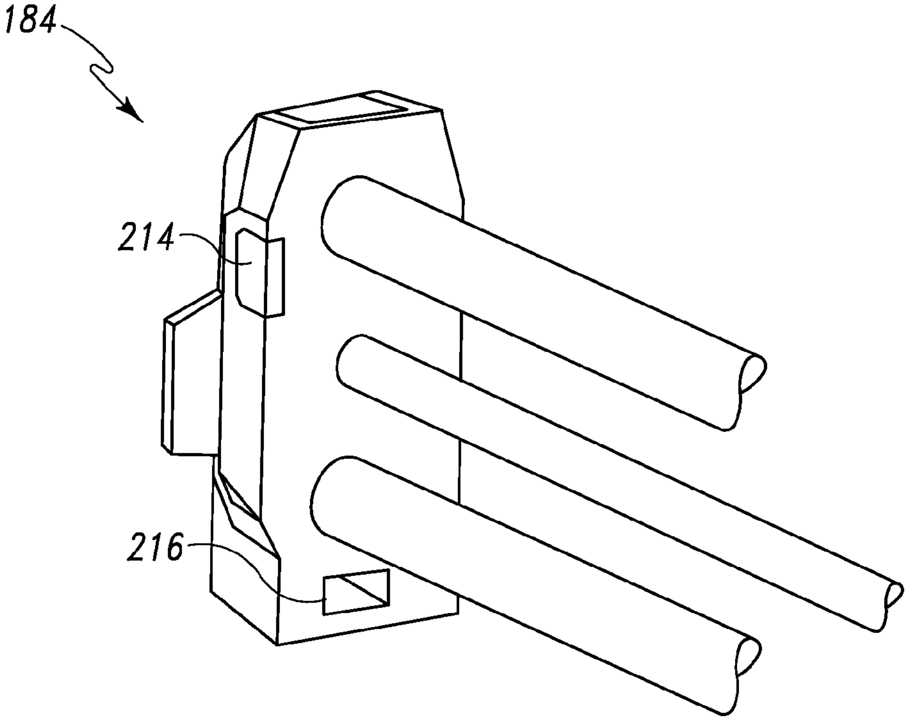
FIG. 10 depicts a side perspective view of the locking pillar of the articulating support structure of the laminate flooring saw system of FIG. 1 showing a rip lock release button and a female A/B switch member.

The locking pillar 184 is shown in FIGS. 9 and 10. A rip lock button 210 is located on the top of the locking pillar 184 and a miter lock arm 212 is located on the outer side of the locking pillar 184. The locking pillar 184 further includes a rip lock release button 214 and a keyed female A/B switch member 216.

Figure 11:
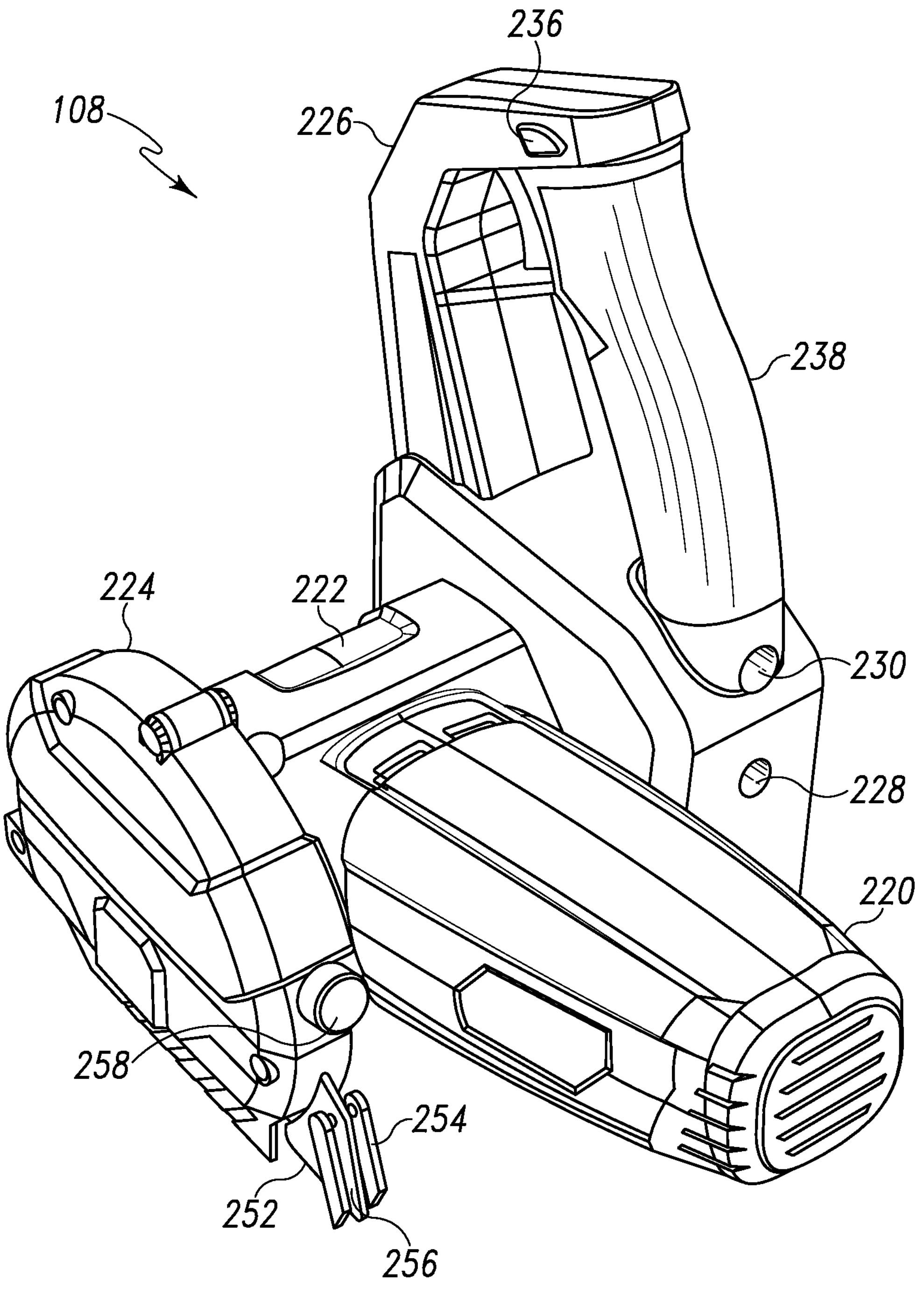
FIGS. 11-13 depict various perspective views of the power tool of the laminate flooring saw system of FIG. 1.
Figure 12:
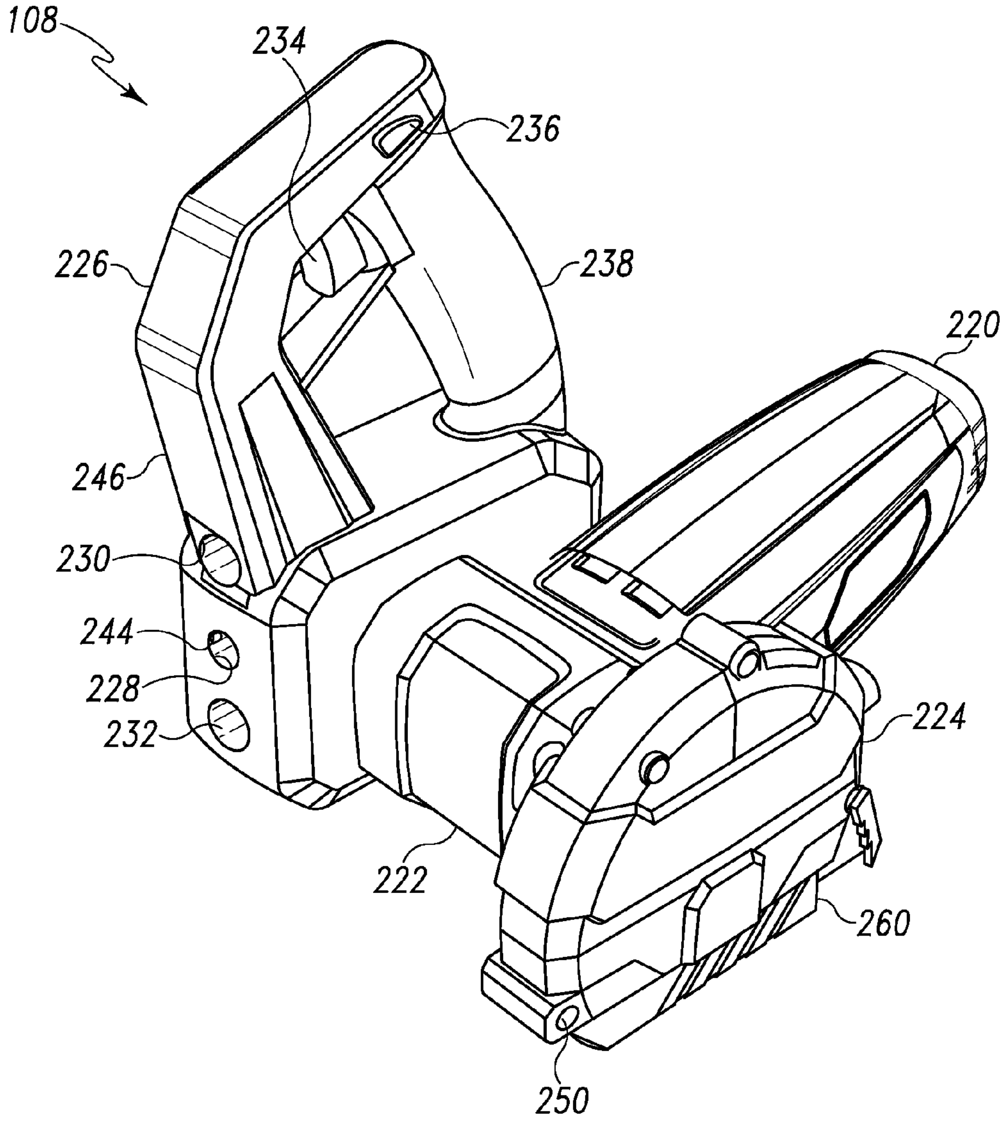
Figure 13:
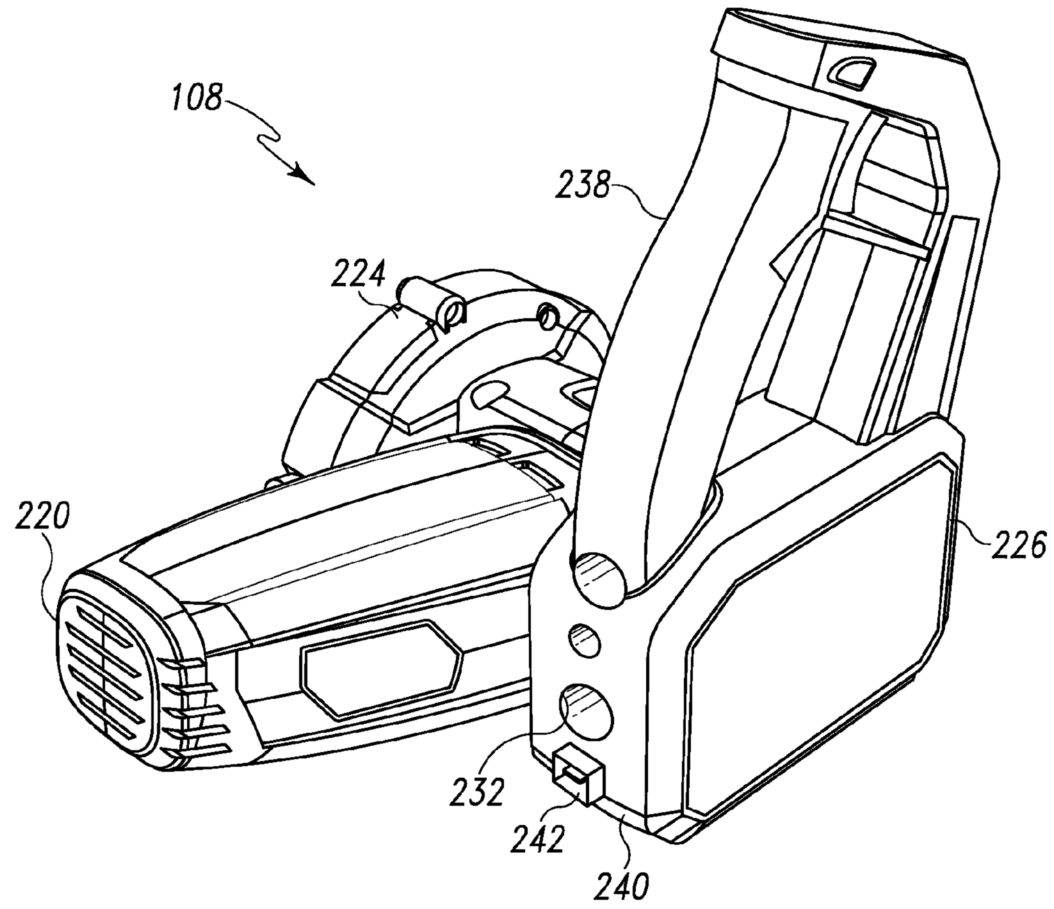

FIGS. 11, 12 and 13 show the power tool 108 removed from the cord support arm 186 and the two circular support arms 188 and 190. The power tool 108 in this embodiment is a circular saw including a motor housing 220, a gear box 222, a blade guard 224 and a handle housing 226. The handle housing 226 includes three bores 228, 230 and 232 sized to receive the cord support arm 186 and the two circular support arms 188 and 190, respectively. A momentary power switch 234 and a lockout switch 236 extend out of the handle housing 226 and a grip 238 is located at the rear 240 of the handle housing 226. A keyed male A/B switch 242 is located below the bore 232 at the rear 240 of the housing 226. The coiled power cord 204 is received by a power port 244 located at the front portion 246 of the handle housing 226.

The blade guard 224 is configured to receive a blade (not shown) operably connected to the power tool 108. A connection member 250 located at the forward portion of the blade guard 224 is provided for attachment of a hold-down bracket (not shown) and two kick-back pawls 252 and 254 are located on a positionable riving knife 256 located at the rear of the blade guard 224 below a riving knife locking knob 258. An extension 260 is pivotably attached to the lower portion of the blade guard 224.

Figure 14:
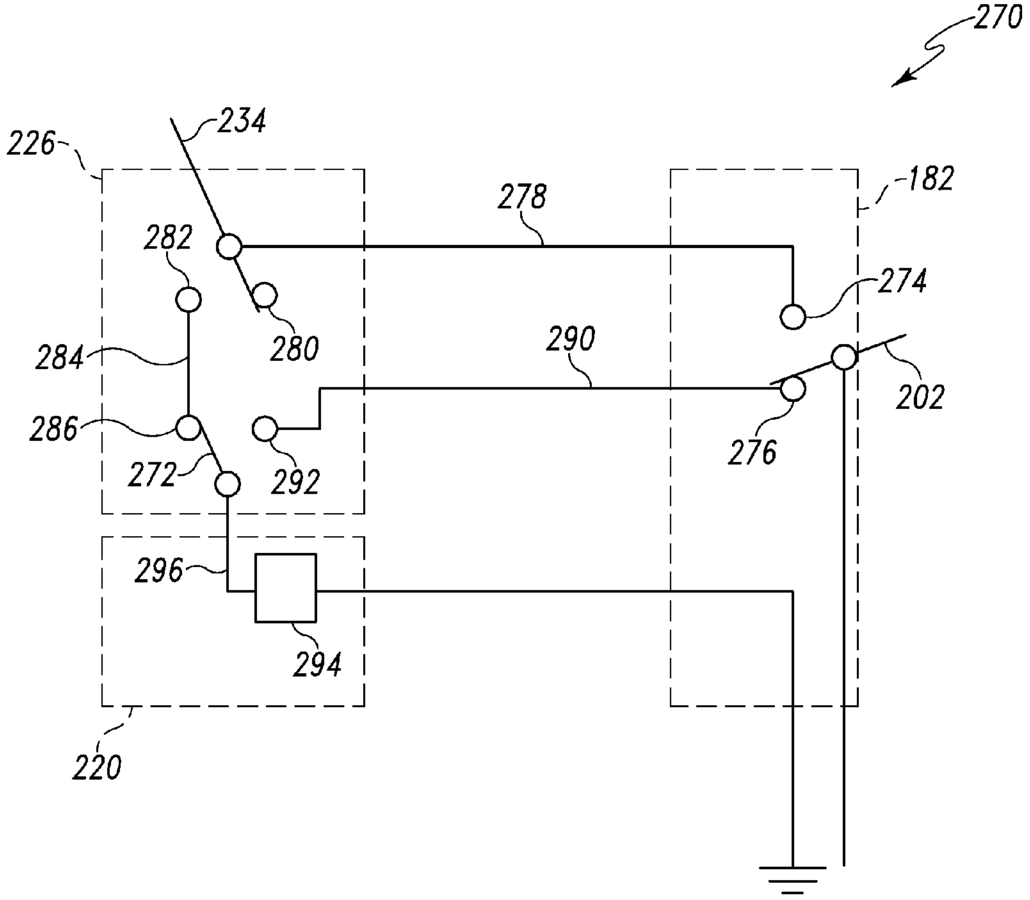
FIG. 14 shows a schematic diagram of the electrical control circuit used to alternatively enable use of a momentary power switch for making miter cuts and a toggle switch for making rip cuts in accordance with principles of the invention.

A schematic of the electrical system 270 of the portable saw system 100 is shown in FIG. 14. The electrical system 270 includes the toggle switch 202 which extends from the base pillar 182, the momentary switch 234 which extends from the handle housing 226 and an A/B switch 272 which, in this embodiment, is located in the handle housing 226. The toggle switch 202 is positionable to apply energy to either a terminal 274 or a terminal 276.

The terminal 274 is connected through a lead 278 to the momentary switch 234. The momentary switch 234 is biased to contact a terminal 280 which is electrically isolated. By application of pressure, the momentary switch 234 can be positioned to contact a terminal 282 which is connected by a lead 284 to a terminal 286 associated with the A/B switch 272. The terminal 276 associated with the toggle switch 202 is connected by a lead 290 to a second terminal 292 associated with the A/B switch 272. The A/B switch 272, which is biased to contact the terminal 286, is connected to a motor 294 in the motor housing 220 by a lead 296.

Figure 15:
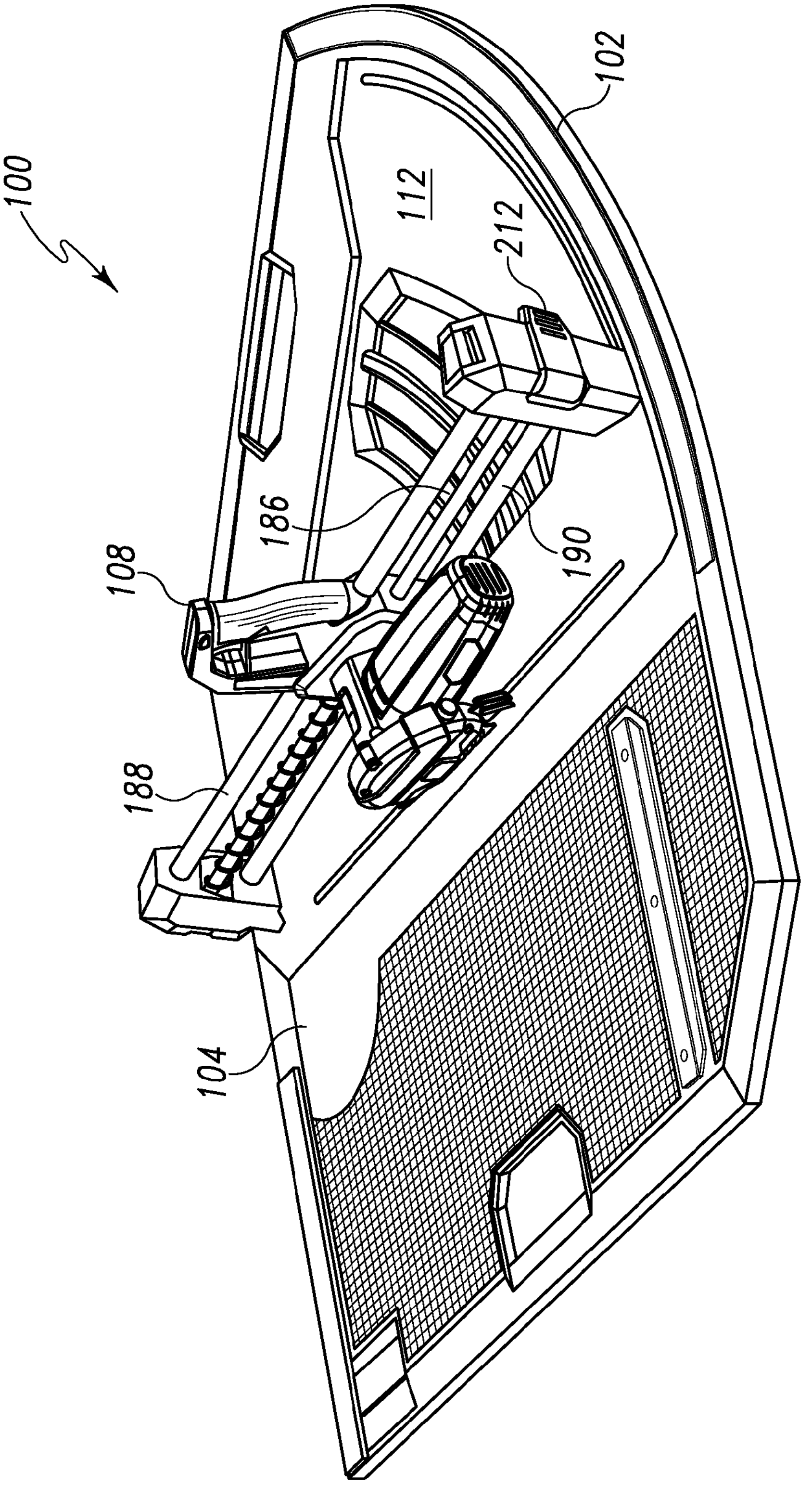
FIG. 15 depicts a top perspective view of the laminate flooring saw system of FIG. 1 with the fence removed.

The portable saw system 100 may be operated in accordance with the following examples. In one example, operation of the portable saw system 100 begins with the fence 106 removed as shown in FIG. 15. With reference to FIGS. 1-6, the articulating base 170 of the articulating support structure 104 is positioned on the sunken articulation surface 112. The pivot 180 extends through the pivot opening 146 and the locking boss 192 extends through the guide slot 148. The miter lock arm 212 is positioned against the locking pillar 184, thereby locking the articulating support structure 104 on the base 102. While a number of variations are possible, the miter lock arm 212 in this embodiment pulls the enlarged head 194 of the locking boss 192 (see FIG. 6) upwardly against the base 102 as the miter lock arm 212 is pivoted toward the locking pillar 184.

With further reference to FIGS. 11-13, the power tool 108 is slidably mounted on the articulating support structure. Specifically, the circular arm 188 slidably extends through the bore 230, the circular arm 190 slidably extends through the bore 232 and the power cord support arm 186 slidably extends through the bore 238. When so positioned, the saw blade (not shown) attached to the power tool 108 extends into the blade slot 178 while the extension 260 is pivotably biased against the articulating base 170. Thus, no portion of the saw blade (not shown) is exposed to a user.

With the portable saw system 100 in this configuration, the operator determines the type of cut that is needed on a work-piece. In the event that the operator desires to perform a rip cut on a work-piece, the fence 106 is positioned on the base 102 with the locking mechanism 162 positioned over the locking member 124 and the handle 168 in a raised position as shown in FIG. 4. Once the fence 106 is positioned along the locking member 124 at a location corresponding the to desired width of the work-piece, the handle 168 is moved in a downwardly direction from the position shown in FIG. 4 to the position shown in FIG. 16, thereby moving the movable dog 164 against the locking member 124 so as to clamp the locking member 124 between the movable dog 164 and the fixed dog 166. Thus, the side 169 of the shaft 154 defines a guide axis perpendicular to the axis 126 associated with the locking member 124 (see FIG. 3). In alternative embodiments, a handle may move a member located between two dogs to clamp the fence.

Figure 16:
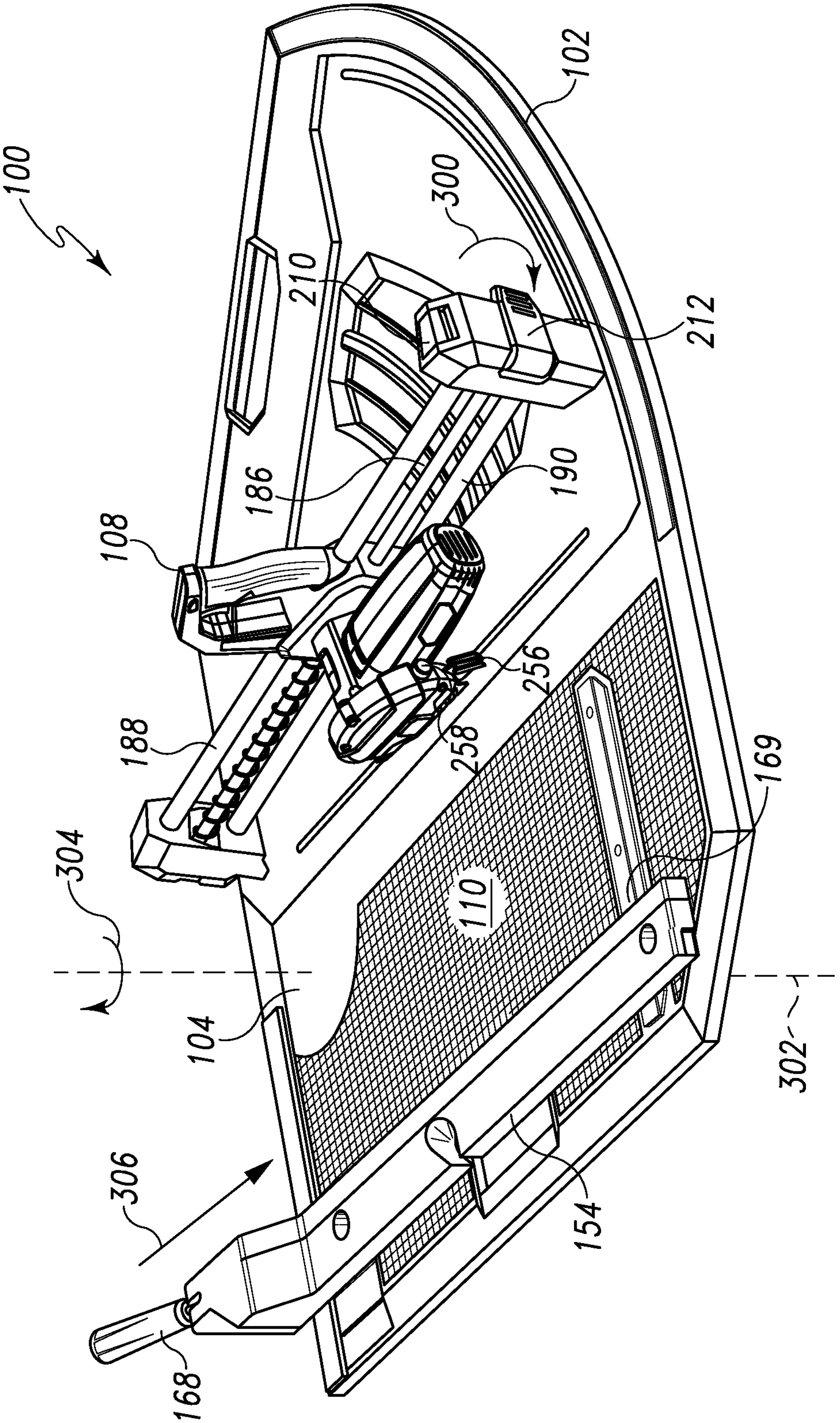
FIG. 16 depicts a top perspective view of the laminate flooring saw system of FIG. 1 with the fence and the articulating support structure positioned for making a rip cut in accordance with principles of the invention.

Next, the articulating support structure 104 is unlocked from the base 102 by movement of the miter lock arm 212 in the direction of the arrow 300 in FIG. 16. The articulating support structure 104 is then pivoted about the pivot axis 302 defined by the pivot 180 in the direction of the arrow 304 until the articulating support structure 104 abuts the wall 140. The articulating support structure 104 is then locked into position by movement of the miter lock arm 212 in the direction opposite the arrow 300 in FIG. 16, thereby pulling the enlarged head 194 against the base 102.

Positioning the articulating support structure 104 against the wall 140 places the circular arms 188 and 190 in a position parallel to the shaft 154. Additionally, the plunger 196 is aligned with the locking bore 150. The plunger 196 is then extended into the locking bore 150 by depressing the spring loaded rip lock button 210. As the plunger 196 extends into the locking bore 150, the rip lock release button 214 automatically engages the plunger 196 locking the plunger 196 within the locking bore 150.

Depression of the rip lock button 210 further causes the female A/B switch member 216 to be configured to accept the male A/B switch member 242. The power tool 108 may then be slid along the circular arms 188 and 190 until the male A/B switch member 242 enters the female A/B switch member 216. To ensure the power tool 108 is not accidentally energized during this movement, the lockout switch 236 may be depressed. Depression of the lockout switch 236 locks the momentary power switch 234 into contact with the electrically isolated terminal 280 (see FIG. 14).

Continuing with FIG. 14, as the male A/B switch member 242 enters the female A/B switch member 216, the A/B switch 272, which is biased toward the terminal 286, is forced away from the terminal 286 and into contact with the terminal 292. Accordingly, the motor 294 may be energized by movement of the toggle switch 202 into contact with the terminal 276.

Returning to FIG. 16, prior to energizing the portable tool 108, the riving knife 256 and the kick-back pawls 252 and 254 are positioned and secured using the riving knife locking knob 258. The portable saw system 100 may then be energized by positioning the toggle switch 202 into contact with the terminal 276 and a work-piece fed onto the upper table portion 110 along the fence 104 in the direction of the arrow 306. As the work-piece engages the extension 260, the extension 260 is pivoted upwardly away from the articulating base 170 exposing the work-piece to the saw blade (not shown). As the work-piece passes by the saw blade (not shown), the riving knife 256 spreads the cut portions of the work-piece to prevent binding of the saw blade (not shown) by the work-piece.

Additionally, the work-piece is positioned underneath the kick-back pawls 252 and 254 as the work-piece passes the saw blade. Accordingly, in the event that the work-piece is forced away from the articulating base 170, the work-piece would contact the kick-back pawls 252 and 254. This would generate a torque on the power tool 108. The power tool 108, however, is prevented from rotation away from the articulating base 170 by the spacing of the circular arms 188 and 190. Accordingly kick-back of the work-piece is prevented as is undesired movement of the power tool 108 away from the articulating base 170.

To switch from rip cutting mode to a miter cutting mode after the saw is de-energized, the fence 106 is removed by moving the handle 168 in an upwardly direction from the position shown in FIG. 16 to the position shown in FIG. 4. This moves the movable dog 164 away from the locking member 124, allowing the fence 106 to be lifted off of the base 102.

Figure 17:
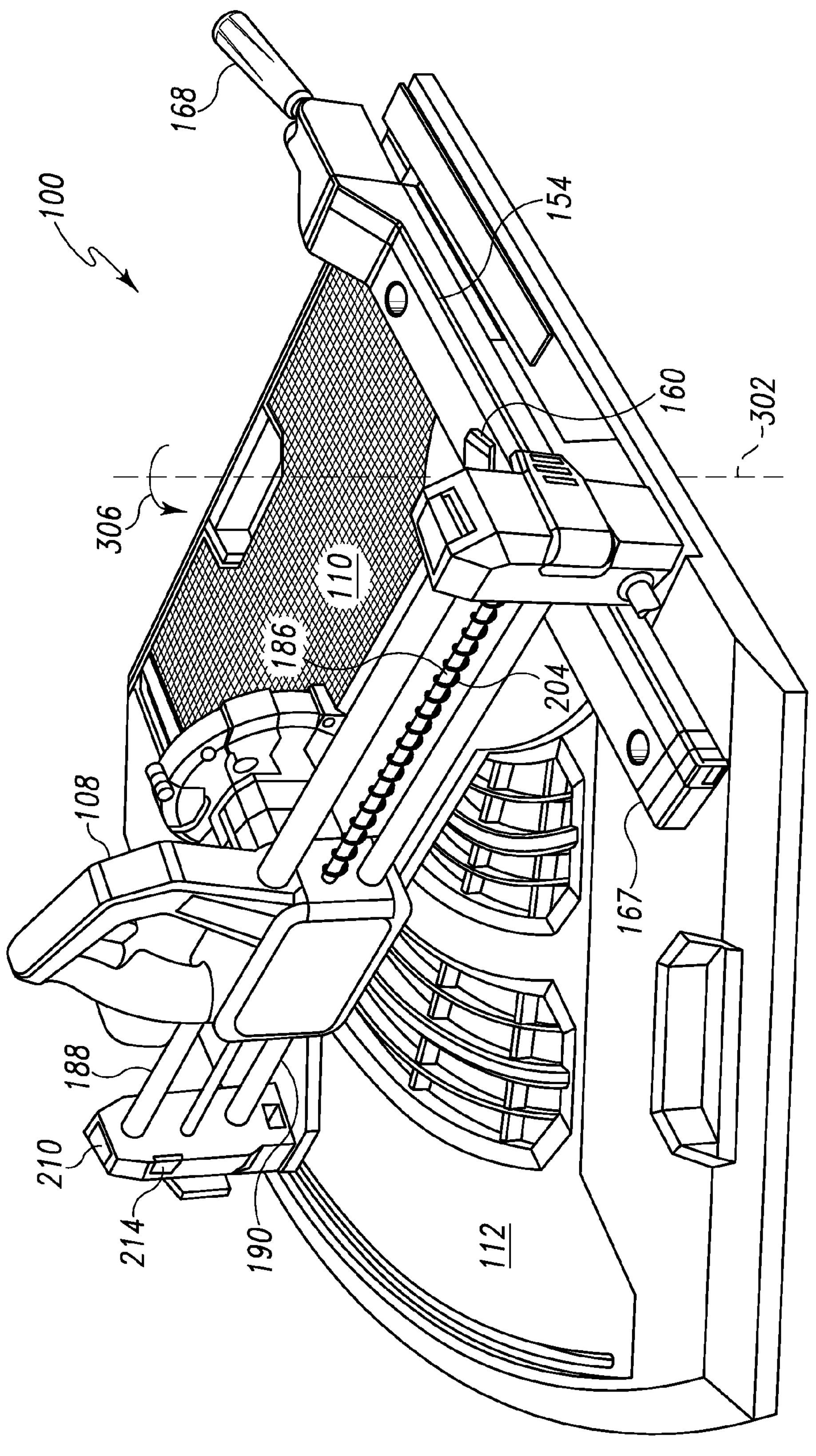
FIG. 17 depicts a top perspective view of the laminate flooring saw system of FIG. 1 with the fence positioned for making a miter cut and the articulating support structure positioned to make a ninety degree miter cut in accordance with principles of the invention.

Next, the fence 106 is positioned on the base 102 with the locking mechanism 162 positioned over the locking member 118. Once the fence 106 is positioned on the locking member 118, the handle 168 is moved in a downwardly direction from the position shown in FIG. 4 to the position shown in FIG. 17 thereby moving the movable dog 164 against the locking member 118 so as to clamp the locking member 118 between the movable dog 164 and the fixed dog 166. Thus, the side 167 of the shaft 154 defines a guide axis perpendicular to the axis 120 associated with the locking member 118 (see FIG. 3).

Next, the articulating support structure 104 is unlocked from the base 102 by sliding the power tool 108 along the circular arms 188 and 190 away from the locking pillar 184 until the male A/B switch member 242 exits the female A/B switch member 216. To ensure the power tool 108 is not accidentally energized during this movement, the lockout switch 236 may be depressed. Depression of the lockout switch 236 locks the momentary power switch 234 into contact with the electrically isolated terminal 280 (see FIG. 14).

Continuing with FIG. 14, as the male A/B switch member 242 exits the female A/B switch member 216, pressure from the female A/B switch member 216 is removed from the A/B switch 272. Thus, because the A/B switch 272 is biased toward the terminal 286, the A/B switch 272 is forced away from the terminal 292 and into contact with the terminal 286. Accordingly, the motor 294 may only be energized by movement of the toggle switch 202 into contact with the terminal 274 and movement of the momentary power switch 234 into contact with the terminal 282.

Movement of the male A/B switch member 242 out from the female A/B switch member 216 further allows the plunger 196 to be withdrawn. This is accomplished by depressing the rip lock release button 214 which releases the rip lock button 210. With the rip lock release button 214 depressed, a spring (not shown) biases the rip lock button 210 in an upwardly direction, thereby withdrawing the plunger 196 from the locking bore 150. Movement of the plunger 196 out of the locking bore 150 causes the female A/B switch member 216 to be configured to not accept the male A/B switch member 242.

In the event that a ninety degree miter cut is desired, the articulating support structure 104 need not be repositioned. If a different angle is desired, the articulating support structure 104 is positioned to the desired angle by swinging the miter lock arm 212 in the direction of the arrow 300 in FIG. 16. This moves the enlarged head 194 away from the base 102. The articulating support structure 104 is then pivoted about the pivot axis 302 defined by the pivot 180 in the direction of the arrow 306 until the articulating support structure 104 is at the desired angle. The graduated angle indicator 138 may be used to assist in positioning the articulating support structure 104.

In this embodiment, when the articulating support structure 104 is positioned with the extension 172 fully positioned within the recessed portion 132, a 45 degree miter cut may be executed on a work-piece. Thus, the articulating support structure 104 can be positioned to provide a miter cut at any desired angle between 45 degrees and 90 degrees. Additionally, because the portable saw system 100 is configured to align a saw blade held by the power tool 108 with the blade slot 178, the cutting axis of the power tool 108 is aligned with the pivot 180 throughout the range of motion of the articulating support structure 104.

Once the articulating support structure 104 is in the desired position, the miter lock arm 212 is pivoted in the direction opposite the arrow 300 in FIG. 16 thereby pulling the enlarged head 194 against the base 102 to lock articulating support structure 104 at the desired position.

Prior to performing a miter cut, the riving knife 256 and the kick-back pawls 252 and 254 are moved away from the articulating base 170 and secured using the riving knife locking knob 258. Additionally, a hold down clamp may be attached to the blade guard 224 using the connection member 250. After setting the height of the hold down clamp as desired, a work-piece is positioned on portable saw system 100. Specifically, the work-piece is positioned against the shaft 154 of the fence 106 and upon the top of the articulating base 170. Depending upon the particular cut and work-piece, the work-piece may also extend onto the upper table portion 110. To facilitate placement of a work-piece across both the articulating base 170 and the upper table portion 110, the height of the articulating base 170 is substantially the same as the height of the wall 140.

The portable saw system 100 may then be energized by positioning the toggle switch 202 into contact with the terminal 274 and depressing the momentary power switch 234 thereby placing the momentary power switch 234 into contact with the terminal 282. With the power tool 108 energized, the operator slides the power tool 108 along the circular arms 188 and 190 toward the fence 106.

As the power tool 108 moves toward the fence 106, the coiled power cord 204 is gathered into the power cord receptacle 200 to ensure the power cord 204 does not contact the work piece or the power tool 108. Additionally, as the extension 260 engages the work-piece, the extension 260 is pivoted upwardly away from the articulating base 170 exposing the work-piece to the saw blade (not shown).

As discussed above, the cutting axis defined by the power tool 108 is aligned with the pivot 180. In order to provide a consistent cut location on a work-piece with respect to the base 102, the pivot opening 146 is positioned such that the axis 302 intersects the guide axis defined by the fence 106 when the fence 106 is locked to the locking member 118. Accordingly, the saw blade (not shown) will cross the guide axis at the same location regardless of the miter angle. So as to allow the entire width of a work-piece to be cut, the blade cutout 160 is positioned and shaped to allow the saw blade to cross the guide axis defined by the side 167.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A portable saw system comprising:

a base;

a movable support arm;

a saw movable along the support arm;

a first power switch proximate the saw and movable with the saw along the support arm;

a second power switch that is not movable with the saw along the support arm; and a third switch movable between a first position wherein application of energy to the saw is dependent upon the position of the second power switch and independent of the position of the first power switch and a second position wherein application of energy to the saw is dependent upon the position of both the first power switch and the second power switch.

2. The portable saw system of claim 1, wherein:

the movable support arm is attached to a platform movable with respect to the base;

the first power switch is movable with the platform; and the second power switch is movable with the platform.

3. The portable saw system of claim 1, further comprising:

an interlock having a first condition wherein the third switch is positionable in the first or the second position and a second condition wherein the third switch cannot be placed in the first position.

4. The portable saw system of claim 3, wherein:

the interlock (i) is in the first condition when the platform is locked at a first position on the base (ii) is in the second condition when the platform is not locked to the base and (iii) is in the second condition when the platform is locked to the base at a second position on the base.

5. The portable saw system of claim 4, wherein the interlock comprises:

a first interlock portion mounted on the saw; and a second interlock portion positioned on a support arm support base, the second interlock portion configured to engage the first interlock portion to place the interlock in the first condition.

6. The portable saw system of claim 5, further comprising:

a first locking member movable between a first position wherein the support arm is locked with respect to the base and the second interlock portion is engageable with the first interlock portion and a second position wherein movement of the support arm with respect to the base is not hindered by the first locking member and the second interlock portion is not engageable with the first interlock portion; and a second locking member movable between a first position wherein the support arm is locked with respect to the base and a second position wherein movement of the support arm with respect to the base is not hindered by the second locking member.

* * * * *